Dec. 8, 1942.　　　　G. H. SWART　　　　2,304,717
CURED RUBBER ARTICLE AND METHOD OF MAKING SAME
Filed June 18, 1940　　　2 Sheets-Sheet 1

INVENTOR
Gilbert Holm Swart
BY
Evans + McCoy
ATTORNEYS

Dec. 8, 1942.     G. H. SWART     2,304,717
CURED RUBBER ARTICLE AND METHOD OF MAKING SAME
Filed June 18, 1940     2 Sheets-Sheet 2

INVENTOR
Gilbert Holm Swart
BY
Evans + McCoy
ATTORNEYS

Patented Dec. 8, 1942

2,304,717

UNITED STATES PATENT OFFICE 2,304,717

CURED RUBBER ARTICLE AND METHOD OF MAKING SAME

Gilbert Holm Swart, Wabash, Ind., assignor to The General Tire & Rubber Company, Akron, Ohio, a corporation of Ohio Application January 18, 1940, Serial No. 314,476

12 Claims. (Cl. 18—53)

This invention relates to microporous rubber, and particularly to a soft microporous rubber article having pores filled with a liquid, and to a method for preparing the same.

An object of this invention is to provide a microporous rubber which is exceptionally absorptive of mechanical vibration.

Another object of this invention is to provide a microporous rubber having a substantial amount of a liquid, which has little or no tendency to evaporate, permanently fixed in the pores thereof, and having high vibration absorbing properties.

Another object of this invention is to provide a porous rubber having a liquid dispersed therein.

A further object of this invention is to provide a method for making microporous rubber having a nonfreezing liquid or solution permanently dispersed in a continuous phase of rubber.

A still further object of this invention is to provide a method of making a vulcanized porous rubber article containing a liquid which is not a rubber solvent dispersed therein.

These and other objects, which will be apparent from the following description of the product and of a method for preparing the same, are accomplished by forming a dispersion of a relatively large amount of water or other liquid, which is not a rubber solvent, in a curable rubber solvent gel, and curing the rubber in the cement without allowing the expansion of the product to a substantial degree, and without permitting any substantial loss of liquid during the curing operation.

Products having greatest resilience and improved aging properties are obtained when rubber latex is used directly in the production of the rubber-solvent gel, but products having masticated rubber are preferred because they appear to have greater absorbing properties.

In the production of the microporous rubber articles, the gel may be formed first, for example, by dissolving masticated solid rubber in solvent, or by violent agitation of latex with solvent, and the water or other liquid which is not a rubber solvent may be mixed in later with further violent agitation. If latex is used, it may be preferred to mix the water and/or other liquid which may be used with the latex, and then combine it with the rubber solution to swell the rubber of the latex and entrap the water in a gel structure. The curing and compounding ingredients may be mixed into the solid rubber on a rubber mill, or added at any time, as is described more fully in the examples below.

Since water is immiscible with petroleum rubber solvents, it therefore acts in latex to prevent the solvent from coming in contact with the rubber particles, and it is desirable to provide a method for breaking down the barrier caused by the film of water surrounding the latex particles. This may either be accomplished by very intense agitation of the two ingredients, such as is produced by beating the two ingredients together with sufficient energy to drive the portions of the solvent through the barrier film of water and into contact with the rubber globules of the latex, or it may be accomplished by the addition of a carrier liquid which is miscible with both the water and the solvent. Thus, illustrating the latter method, the dispersion of water in the rubber cement may be produced by adding acetone to a naphtha or other petroleum solvent latex mixture. The acetone, being miscible in both the water and the petroleum solvent, acts as a carrier medium carrying the solvent through the film of water covering the globules of water, and by slight agitation of the mixture a thick gel is almost instantly formed. The rapid swelling of the rubber entraps the water present in the gel structure.

The proportions of the ingredients may be varied greatly to produce products having different characteristics and vibration absorbing capacities. However, the quantity of solvent used should in all cases be sufficient to cause a substantial swelling of the rubber globules, and produce a continuous phase of rubber in which the water may be retained in suspension. The rubber may amount to as little as 5 or 6 percent of the rubber solvent mixture, or to as much as 40 or 50 percent, the lower intermediate quantities being preferred. When the rubber content is too low, separation of the water and solvent mixture may occur before or during the curing operation, and when the quantity of solvent is too low, it is difficult to incorporate sufficient water or other nonrubber solvent into the mix, and the material becomes too solid for good vibration absorption.

Products having the faculty of absorbing energy from a vibrating body placed in intimate contact therewith may be produced when the rubber constitutes as low as 3 or 4 percent of the total quantity of rubber and liquid constituents, or as much as 30 or 40 percent of these ingredients, depending on the character of the rubber. With latex, a smaller amount of rubber may be preferred.

The curable rubber gel containing water dispersed therein is incorporated in suitable molds and cured at a suitable temperature without substantial blowing of the material or any substantial loss of the liquid constituents. If the curing temperature used is above the boiling point of the liquids present in the gel, the mold should be cooled below this boiling point before the product is removed. Another method of curing is to immerse the mold or product in a suitable liquid at the desired temperature.

Figure 1:
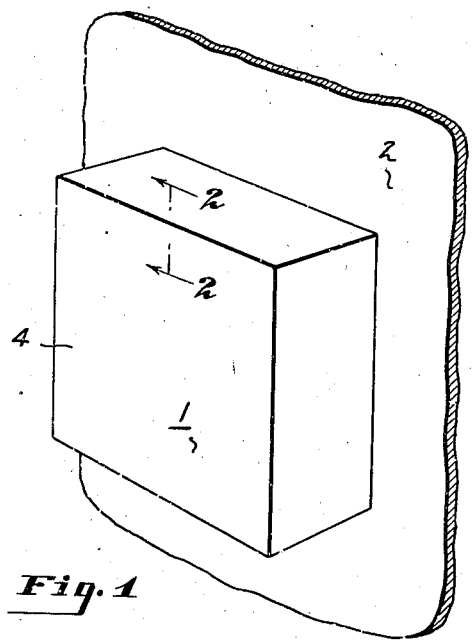
Figure 1 is a perspective view of a portion of a metal panel having a block of the rubber product adhered thereto for vibration absorption.
Figure 2:
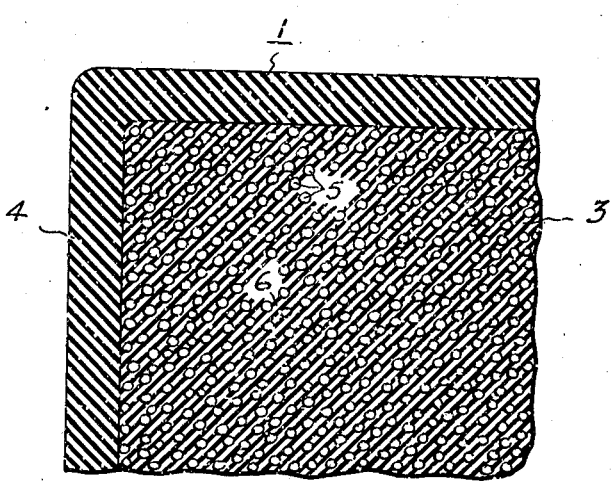
Fig. 2 is a greatly enlarged sectional view on the line 2—2 of Fig. 1, showing the structure of the rubber product of the present invention.
Figure 3:
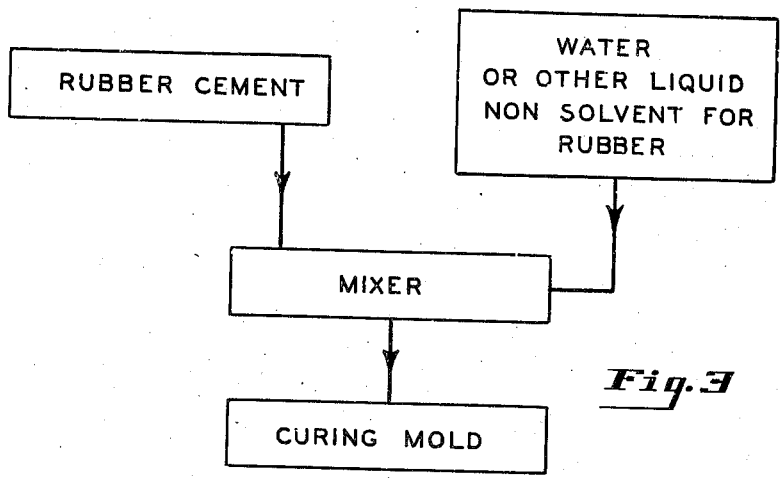
Fig. 3 is a flow sheet schematically indicating the process of repairing the rubber product of the present invention.
Figure 4:
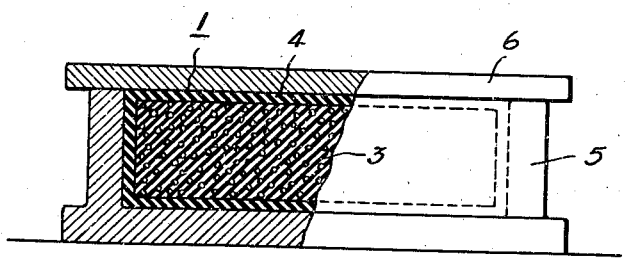
Fig. 4 is an elevational view of a mold suitable for use in preparing the article of the present invention and having a portion broken away showing an article therein.

Referring more particularly to the drawings, the product 1, which, for vibration dampening, is usually attached to only a portion of a panel 2, comprises a gel-like body portion 3 and preferably a relatively thick, impervious skin 4, which may be solid rubber. The body portion comprises a multitude of fine, microscopic pores 5, filled with liquid and dispersed within a web 6 of rubber, which is preferably in the solvent-swollen condition.

The product is soft and porous, having the liquid intimately dispersed therein. The rubber is held in a swollen or stretched condition by the liquids. The nonsolvent liquid decreases the tendency for shrinkage of the material if a substantial amount of the rubber solvent should evaporate. The liquid in the pores of the product appears to be essential for maximum sound or vibration absorbing efficiency, and it is therefore, desirable to prevent loss or solidification of liquid constituents which may be present.

A thin skin of substantially nonporous rubber is usually formed in the mold about the entire surface of the article when prepared as described above. While such skin retards the loss of the liquid and any substantial loss of efficiency over a period of months, it may be preferable to give the article a thicker nonporous coating of a suitable material. The preferred coating is rubber, and it may be applied in any suitable manner as by dipping the cured, or preferably partially cured product in a suitable compounded concentrated latex, or by forming a substantial layer of rubber over the interior of the mold prior to adding the homogeneous dispersion of rubber, solvent and water. A layer of rubber of the desired thickness may be conveniently formed by shaking a small quantity of heat sensitive latex in a warm mold and decanting the ungelled portion. The layer on the mold surface is preferably allowed to dry before the above gel is added. If a skin coating is used, the compounding and the curing rate of the coating material should be selected in accordance with the procedure of those skilled in the art so that good adhesion of the skin on the article will be obtained.

The following examples, in which the parts are by weight, illustrate preparation of the porous material in accordance with this invention:

*Example I*

| | Parts |
|---|---|
| Rubber latex, having 60% rubber solids | 150 |
| Sulphur | 2 |
| Zinc oxide | 3 |
| Antioxidant (phenyl-beta-naphthylamine) | 1 |
| Accelerator: | |
| (Piperidine pentamethylene dithiocarbamate) | .5 |
| (Mercaptobenzothiazole) | .5 |
| Water | 175 |
| Naphtha or gasoline | 300 |

The latex and the solvent were violently agitated together to produce a thick gel-like structure having the water of the latex uniformly dispersed therein. The water was then whipped into this gel by further violent agitation. The compounding reagents sulphur, zinc oxide, antioxidant and accelerator may be either mixed with the latex prior to the addition of a solvent, or may be added to the mixture any time thereafter. It is usually desirable, however, to have the compounding ingredients incorporated into the latex before it is mixed with the solvent. The gel formed from the above was then poured into a suitable closable mold in sufficient quantity to fill it, and cured for 30 minutes at 100° C. without permitting the loss of solvent or liquid from the mass. The mold was then cooled and the product having a fine porous structure with substantially all the pores filled with water was removed.

When a suitable quantity of a heat sensitive latex was poured into the warm mold so as to provide a relatively thick layer of gelled latex over the entire surface prior to the addition of the rubber-water gel, the product removed from the mold had a relatively thick skin over its entire surface which effectively prevented any substantial loss of solvents or liquids from the material.

*Example II*

| | Parts |
|---|---|
| Rubber (smoked sheet) | 100 |
| Zinc oxide | 6 |
| Sulphur | 3.5 |
| Mineral rubber (oxidized asphalt) | 4.5 |
| Captax (mercaptobenzothiazole) | 0.9 |
| Solvent (gasolene) | 890 |
| Water | 520 |
| Glycerine | 20 |
| Ultra accelerator: | |
| Butyl zimate | 4 |
| 808 (butyraldehyde-aniline condensation product) | 2 |

The rubber, zinc oxide, sulfur, mineral rubber, and captax, the latter as a 10 percent master batch, were thoroughly mixed and masticated on a rubber mill and dissolved in the rubber solvent, forming about a 10 percent rubber cement. The water, glycerine and ultra accelerators were then incorporated into the cement by extremely violent agitation. The material was then poured into cold molds of a suitable shape and having a thickness of more than one-fourth inch, and allowed to cure at room temperature for 24 hours or so. The product, which contained about 6 percent of rubber, had a thin skin of rubber over its entire surface which inhibited vaporization of solvent and liquid from the material. Most of the solvent remained in the rubber to produce a vulcanized gel having the water intimately dispersed therein. The swelling agents appeared to greatly increase the hysteresis loss of the rubber so that the product had exceptional vibration absorbing qualities. After the product has been cut a considerable shrinkage of the surface may be noted, indicating that the rubber is normally held under tension or in a swelled condition in the material.

The glycerine was added in the above examples to prevent the evaporation of liquid from the product. It may be added in larger quantities to prevent freezing of the liquid, in which case it may replace some of the water and solvent if desired. It may be substituted in whole or in part by other nonvolatile liquids, or nonfreezing solutions which are preferably of a hygroscopic nature, and which are not harmful to the rubber and are capable of being incorporated in the gel or latex by methods illustrated by Examples I and II.

Synthetic rubber cements and other suitable rubber-like materials of similar nature may also be used in place of the latex and rubber cements in the above examples, if desired.

When the products produced above are placed in contact with a vibrating solid, they have the property of absorbing the energy from the solid and thereby preventing the vibration of the same. In the application of the product to panels, such as automobile body panels and the like, it has been found that the whole surface of the panel need not be covered. The vibrating energy is almost entirely absorbed when small but comparatively thick pieces are attached at one or more suitable positions on the panel. Such pieces need occupy but a very small percentage of the panel's surface, and should preferably be attached at one or more points where loops naturally occur. In the deadening of panels, such as body panels or floors of automobiles, etc., pieces such as for example those 2 or 3 inches square and ½ inch thick are attached at one or more nonadjacent positions to the metal with a suitable cement.

The manner of operation of the material in absorbing vibration is not known, but it appears that groups of the small particles of liquid which are suspended on the highly absorbent and elastic rubber are caused by the impressed vibration to act as separate masses of a size such that the natural frequency of its system is equal to the vibration impressed. They may thus absorb unlimited energy and effectively prevent the vibration of the contacted panel.

In the appended claims, the term rubber includes synthetic rubber as well as natural rubbers. Furthermore, it is to be understood that the particular methods and compounds disclosed, and the procedures set forth are merely illustrative, and are presented for purposes of explanation and illustration, and that various equivalents of the methods can be used and modifications of the procedure made without departing from the spirit of my invention.

What I claim is:

1. A method for making a soft microporous rubber containing liquid in its pores, which comprises forming an intimate curable mixture of rubber, a rubber solvent and a substantial proportion of liquid which is immiscible with the rubber solvent, and curing said intimate mixture in a mold without permitting substantial loss of said liquid.

2. A method for making a rubber product having high vibration absorption and liquid dispersed therein, which comprises forming a curable cement of rubber and a rubber solvent, dispersing a substantial amount of water in said cement, filling a mold with the dispersion, and curing the material in the mold without substantial loss of said water.

3. A method for making a soft microporous rubber containing liquid in its pores, which comprises forming a curable gel of rubber, rubber solvent and water, and curing said gel without the loss of substantial amounts of said water and without permanently increasing the volume of said gel in a substantial amount.

4. A method for making a soft microporous rubber containing liquid in its pores and possessing vibration absorbing characteristics, which comprises forming a curable gel of rubber, a rubber solvent and a substantial proportion of liquid which is immiscible with said rubber solvent, and curing said gel in a mold lined with a layer of pore sealing material without permitting substantial loss of said liquid.

5. A method for making a soft microporous rubber containing liquid in its pores, which comprises forming a curable gel of rubber, a rubber solvent, and a substantial proportion of liquid which is not a rubber solvent and which is immiscible therewith, curing said gel in a mold without permitting substantial loss of said liquid, and coating the surface of the molded product with a layer of relatively nonporous rubber.

6. A method for making rubber having high capacity for absorbing vibration, which comprises forming a curable gel of rubber and a rubber solvent, and having a substantial proportion of water dispersed therein, and curing said gel in a mold without permitting substantial loss of said liquid, whereby a soft microporous rubber product having liquid permanently in the pores of the rubber is produced.

7. A soft porous rubber product characterized by having a plurality of fine pores, a liquid which is immiscible with a rubber solvent fixedly disposed in said pores in a sufficient amount to prevent substantial shrinkage of the rubber.

8. A soft rubber product which is highly absorptive of small mechanical vibrations, comprising a vulcanized gel of rubber, a rubber solvent and a liquid which is immiscible therewith and which is not a solvent for rubber, said nonsolvent being present permanently within said rubber and in a sufficient proportion to hold the rubber under tension.

9. A soft, resilient porous rubber product characterized by having water fixedly disposed in the fine pores thereof in a sufficient amount to maintain the rubber under tension.

10. A soft, resilient rubber product which is highly absorptive of small mechanical vibrations, comprising a vulcanized gel of rubber, a rubber solvent and water, said water being fixedly present in said vulcanized gel in a sufficient proportion to hold the rubber under tension.

11. A soft rubber product comprising a solid vulcanized gel of rubber, a rubber solvent, and a liquid which is immiscible with the rubber solvent, and a skin of relatively nonporous material covering substantially its entire surface, said nonsolvent liquid being present in a sufficient amount to prevent the entire shrinkage of the rubber.

12. A soft vulcanized microporous rubber, having a substantial quantity of a liquid which is not a rubber solvent and is immiscible therewith, permanently held and permanently enclosed in its pores.

GILBERT HOLM SWART.